Dec. 12, 1950 — C. D. RICHARD — 2,533,506
UNIVERSAL COIL WINDING MACHINE
Filed May 1, 1947 — 6 Sheets-Sheet 1

FIG. 1

INVENTOR
C. D. RICHARD
BY J. MacDonald
ATTORNEY

Dec. 12, 1950 — C. D. RICHARD — 2,533,506
UNIVERSAL COIL WINDING MACHINE
Filed May 1, 1947 — 6 Sheets-Sheet 4

INVENTOR
C. D. RICHARD
BY J. MacDonald
ATTORNEY

Dec. 12, 1950  C. D. RICHARD  2,533,506
UNIVERSAL COIL WINDING MACHINE
Filed May 1, 1947  6 Sheets-Sheet 5

INVENTOR
C. D. RICHARD
BY J. MacDonald
ATTORNEY

Dec. 12, 1950  C. D. RICHARD  2,533,506
UNIVERSAL COIL WINDING MACHINE
Filed May 1, 1947  6 Sheets-Sheet 6

INVENTOR
C. D. RICHARD
BY J. MacDonald
ATTORNEY

Patented Dec. 12, 1950

2,533,506

UNITED STATES PATENT OFFICE 2,533,506

UNIVERSAL COIL-WINDING MACHINE

Charles D. Richard, West New Brighton, N. Y., assignor to Bell Telephone Laboratories, Incorporated, New York, N. Y., a corporation of New York Application May 1, 1947, Serial No. 745,213

7 Claims. (Cl. 140—92.2)

This invention relates to coil winding machines.

The object of this invention is the provision of a coil winding machine for the winding of different types of coils which is simple in construction, and accurate in operation.

Figure 1:
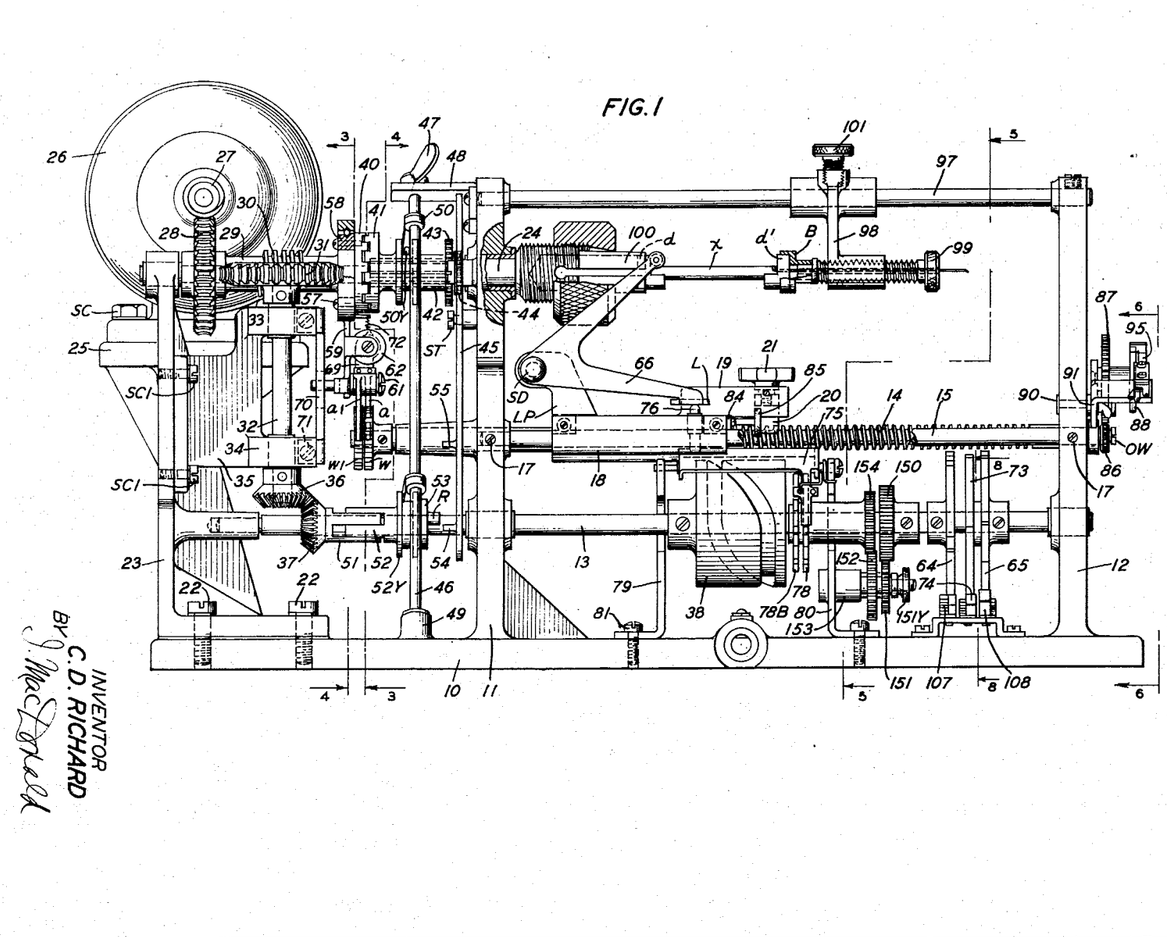
Fig. 1 is a front elevation view showing a number of operating parts in section.

In accordance with the construction of the coil winding machine of this invention, a base 10 is formed with upright supports 11 and 12 serving for rotatably supporting a cam shaft 13, a lead screw 14 and a rod 15, the latter having its opposite ends secured on the upright supports 11 and 12 by set screws 17 best seen in Fig. 1. On rod 15 and lead screw 14 is slidably mounted a carriage 18 which is formed with a projection 19 serving for mounting a nut or comb-shaped member 20 having screw threads for engaging the lead screw 14, a knob 21 being provided to move the comb 20 in and out of engagement from the lead screw 14 depending upon the type of coil to be wound as will be hereinafter described in detail.

On base 10 is secured as by a plurality of screws 22 an upright support 23 which cooperates with the upright 11 for rotatably supporting a spindle 24, the upright support 23 having a portion 25 forming a base for securely mounting as by screws SC a motor 26 on the armature shaft of which is keyed a worm 27 disposed in meshing relation with a worm gear 28 formed with or carried by a sleeve 29 mounted for free rotation on the spindle 24. The sleeve 29 is formed with a worm 30 engaging a worm gear 31 keyed on one end of a vertically disposed shaft 32 journaled in bearings 33 and 34 formed with a bracket 35 secured to the upright support 23 as by a plurality of screws SC1 and on the lower disposed end of shaft 32 is keyed a pinion 36 meshing with a similar pinion 37 keyed on shaft 13 for rotating the latter and a plurality of cams 38, 38, 38B, 44, 48 and 55 provided to perform functions which will be hereinafter described in detail. The rotation of cam 38 for the winding of the cathode ray tube shown in Fig. 11 for example is effective to impart a reciprocating angular movement to a wire guiding arm 39, Figs. 9 and 10, in timed relation with the reciprocatory operation of spindle 24 and the mandrel M mounted thereon by a mechanism which will be hereinafter described in detail.

Figure 4:
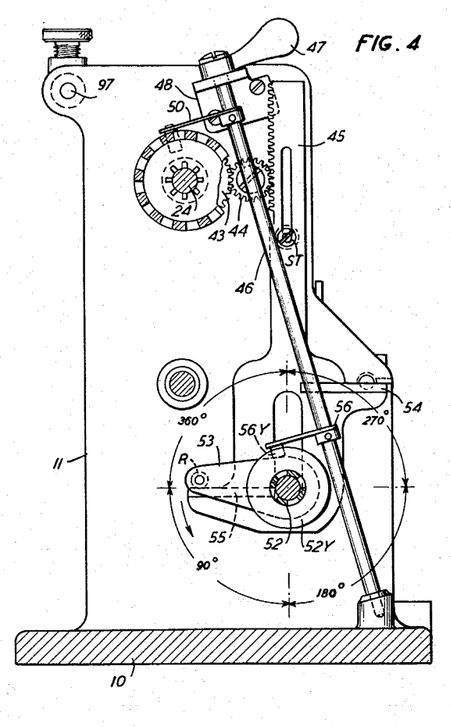
Fig. 4 is a vertical cross-sectional view taken on line 4—4 of Fig. 1.

The sleeve 29 is formed with a clutch element 40 for engaging a complement clutch element 41 formed with a sleeve 42 mounted for sliding movement on a spline portion of spindle 24 as best seen in Fig. 4. The longitudinal movement of sleeve 42 for moving the clutch element 41 in and out of engagement from clutch element 40 is effected by the manual operation of a knob 47 secured on one end of a rod 46. This rod is pivoted at its upper disposed end in a bracket 48 secured to the upright 11 and at its lower end in a bearing 49 formed with the base 10. On rod 46 is keyed an arm 50 provided at its free end with a pin 50Y engaging a collar formed with the sleeve 42. The longitudinal movement of sleeve 42 as for engaging the clutch element 41 which as for clutch element 40 is effective to disengage a gear 43 secured thereto from a pinion 44 best seen in Figs. 1, 2 and 4, pinion 44 being rotatably mounted on a shoulder screw SW engaging a similarly screw-threaded hole in upright support 11.

Pinion 44 is disposed in meshing relation with the gear rack portion of a bar 45 guided for sliding movement at its upper disposed end portion by a shoulder screw ST and at its lower end by the shaft 13. The bar 45 as best seen in Figs. 1, 2, 4 and 9 is provided with lug or track elements 54 and 55 extending at right angles from the plane thereof for successive engagement with a roller R mounted at the free end of an arm 53 mounted for sliding movement on the shaft 13 but rotatable therewith through a clutch element 51 formed with pinion 37 and a clutch element 52 formed in the hub portion of arm 53. An arm 56 keyed on rod 46 is provided with a pin 56Y engaging a collar 52Y formed with the hub portion of lever 53 for moving this arm from the position shown in Fig. 1 to the position wherein the roller R is effective to alternately engage the lugs 54 and 55 upon the rotation of shaft 13 for imparting reciprocating longitudinal movement to the bar 45 for rotating the pinion 44 now engaging the gear 43 and thereby imparting rotary reciprocating movement to the spindle 24 in timed relation with the operation of the wire guiding arm 39 under control of cam 38, the operation of arm 53 for engaging the roller R with lugs 54 and 55 of bar 45 being effected simultaneously with the disengaging of clutch element 41 from clutch element 40 by the arms 50 and 56 respectively on rod 46.

Figures 6, 6A, 6B:
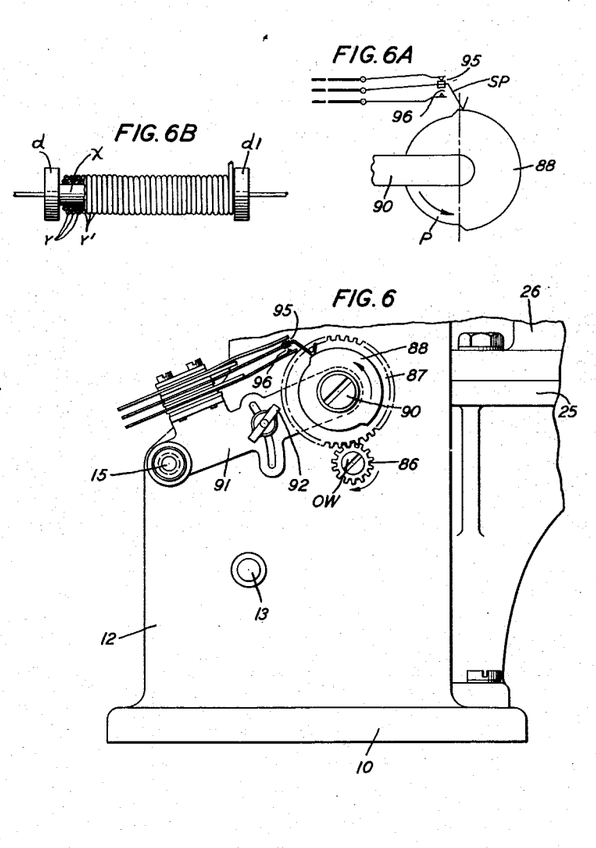
Fig. 6 is a partial view looking along the line 6—6 of Fig. 1.
Fig. 6A is a detail view of Fig. 6 enlarged showing a cam and a pair of contacts actuated thereby, used for controlling the energization of electromagnets for winding one type of coil.
Fig. 6B is a view of a type of coil wound according to the operation of the winding mechanism under control of the cam and contacts shown in Figs. 6 and 6A.
Figure 10:
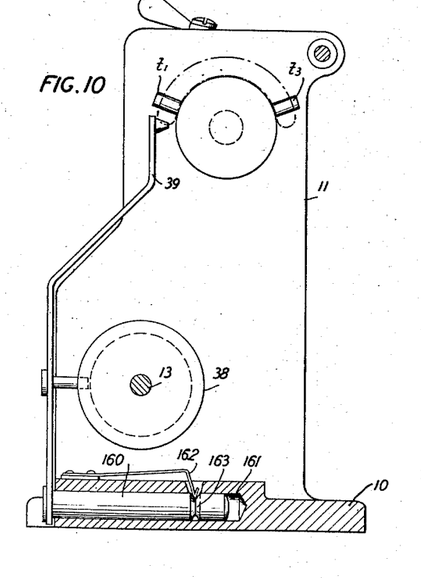
Fig. 10 is a cross-sectional vertical view taken along lines 10—10 of Fig. 9.

The wire guiding member 39 is secured at one end of a spindle 160 best seen in Fig. 10 fitted for free rotation in a bearing 161 formed with the base 10, the spindle being held against longitudinal movement in its bearing by a spring 162 having its free end portion engaging a circular groove 163 in the spindle 160 so as to permit the ready assembly and removal of the wire guiding arm 39 when not in use as for the winding of the coils shown in Figs. 6B, 7C and 8B as examples.

The operation of the mechanism above described with the exception of carriage 18 and of the lead screw 14, is that used for the winding of the cathode ray tube coil shown in Fig. 11 as will hereinafter be described in detail.

Figure 2:
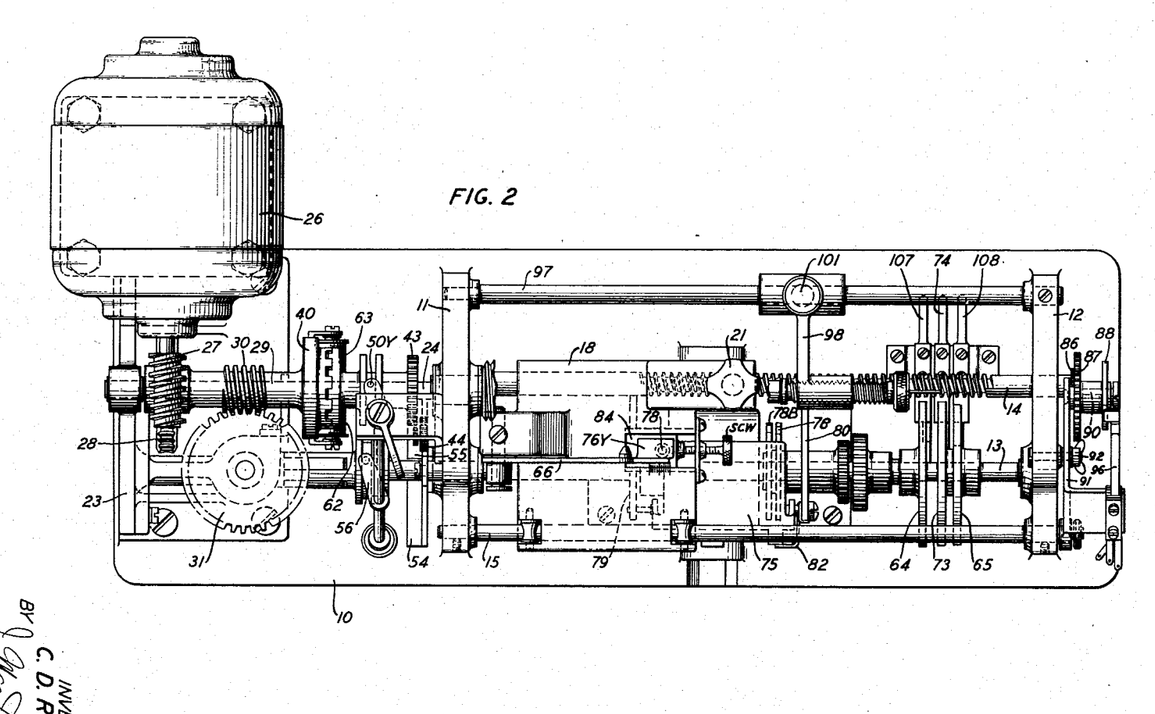
Fig. 2 is a top view.
Figure 3:
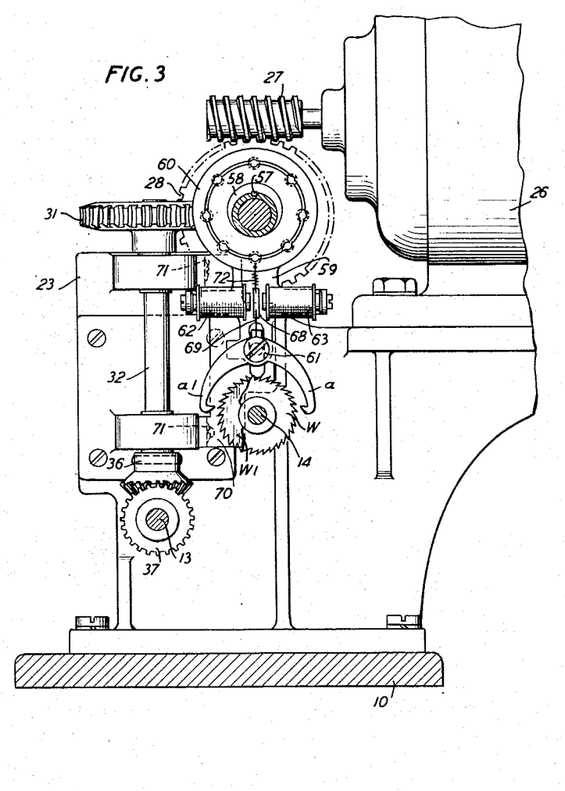
Fig. 3 is a vertical cross-sectional view taken on line 3—3 of Fig. 1.

On sleeve 29 in position adjacent to the clutch element 40 as best seen in Figs. 1, 2, 3 and 9, is secured as by a key member 57, an eccentric disc 58 provided for imparting reciprocating movement to an arm 59 formed integrally with the outer ring 60 of a ball bearing, the inner ring of which is fitted over the periphery of the eccentric disc 58. The arm 59 as best seen in Figs. 1 and 3 is provided at its lower disposed end with a shoulder screw 61 serving for pivotally mounting a duplex pawl, the arms a and a1 of which are disposed for engaging respectively associated ratchet wheels w and w1 formed for operation in opposite directions. These ratchet wheels are keyed on one end of the lead screw 14 for imparting a clockwise and a counter-clockwise rotation to the lead screw depending upon the energization of electromagnets 62 and 63 for moving the carriage 18 and thereby an angle lever 66 in direction transverse of the core. The lever 66 is pivoted on a stud SD extending from a lug portion LP of the carriage and serves for guiding the wire of the coil to form the superposed layers of the type shown in Figs. 6B, 7A, and 8A instead of the wire guiding member 39 used for the winding of cathode ray tube coils of the type above referred to.

The duplex pawl is provided with a spring 69 fitted with an armature 68 disposed in attractable relation with either one of the magnets 62 and 63 for moving the arms a and a1 of the duplex pawl in engagement with their respectively associated ratchet wheels w and w1, while the shoulder screw 61 is formed with a projection for engaging a slot in a plate 70 so as to hold the free end of arm 59 against sideway movement upon its reciprocating movement for operating the ratchet wheels w and w1, as the case may be, the armature 68 and therefor the arms a and a1 of the duplex pawl being normally held in the non-operated position by a retractile spring 72 having one of its ends secured to the ring portion 60 of arm 59 and its other end to the armature 68 as best seen in Fig. 3.

Figures 7, 7A, 8, 8A, 13:
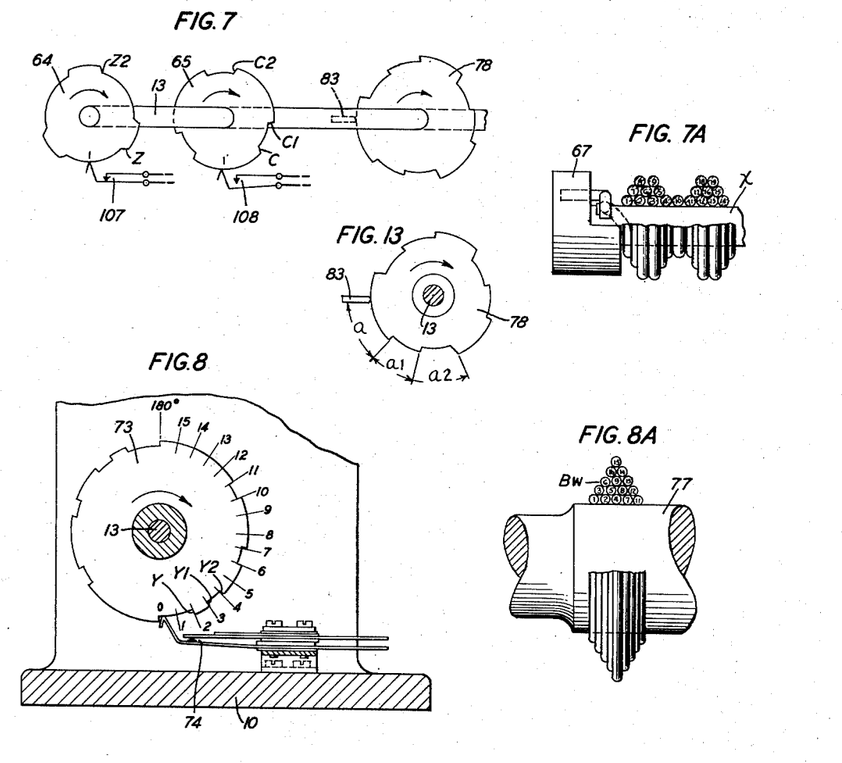
Fig. 7 is a perspective view of two of the cams and associated contact springs shown in Fig. 1 used for controlling the energization of the electromagnets shown in Fig. 3 for winding another type of coil.
Fig. 7A is a view of a portion of a coil wound by the operation of the winding mechanism under control of the cams and contact springs shown in Fig. 7.
Fig. 8 is a view of a cam and an associated contact spring used for controlling the operation of one of the magnets shown in Fig. 3 for the winding of another type of coil.
Fig. 8A is a view of a coil wound according to the operation of the mechanism as controlled by the operation of the cam shown in Fig. 8.
Fig. 13 is a view of a cam wheel used in cooperation with the cam wheel shown in Fig. 8 for winding the type of coil shown in Fig. 8B.

A cam 78 as best seen in Figs. 1, 7 and 13 is mounted for free rotation on shaft 13 and is actuated by a gearing mechanism comprising a gear 150 keyed on shaft 13, a pinion 151 and a gear 152 rotatable as a unit on a stud 151Y and a pinion 154 formed with the hub portion of cam 78, the speed ratio being of the order of two turns of cam 78 for each turn of cams 64 and 65 keyed on shaft 13, the cam 78 serving for controlling the angular movement of wire guiding member 66 in timed relation with the operation of the carriage 18 itself under control of the cams 64 and 65 as will be hereinafter described in detail.

The cam wheels 64 and 65 are each provided with peripherally disposed cam portions for operating the contact members 107 and 108 connected in the energizing circuit of electromagnets 62 and 63, the latter as above mentioned serving to control the direction of rotation of lead screw 14 and thereby that of the wire guiding member 66 along the longitudinal axis of a core x mounted on the spindle 24 and operable in timed relation with the operation of a plate 75 as effected by the tension of a spring 82 under control of the cam 78, the plate 75 actuating a plunger 76 slidably mounted on a carriage 84 in turn slidably mounted on carriage 18, the plunger 76 being disposed in operative relation with the plate 75 and a lug portion 76Y formed with one arm of wire guiding member 66 so as to impart angular movement to this arm upon each reverting movement of the pile-up in the winding of the coil of the type as shown in Fig. 7C, the movement of carriage 84 being for adjusting the angular movement of arm 66 relative to the size of wire used for the winding of a particular type of coil.

The plate 75 is pivoted on upright supports 79 and 80, secured to the base 10 as by a number of similar screws 81. Support 80 is provided with a bushing 153 for receiving a shoulder screw 151Y serving for pivotally mounting the gear unit 151—152, which may be removed from the machine when the cam 78 is not used. The carriage 84, best seen in Figs. 2 and 5 may be moved by the turning movement of a thumb screw SCW for positioning the pin 78 along lug 76Y of arm 66 for effecting the angular adjustment of the latter as above described.

A pinion 86 is keyed on the end of lead screw 14 adjacent the upright support 12 and is held securely thereon by a screw OW best seen in Figs. 1 and 6. This pinion meshes with the gear 87 mounted for free rotation on a stud 90 laterally extending from a lever member 91 pivoted as on the end of rod 15. Lever 91 is provided with an arcuate slot engaged by a thumbscrew 92 serving for securing the lever 91 and the gear 87 mounted thereon in and out of meshing relation with pinion 86 depending upon the type of coil to be wound. The gear 87 is formed with a hub portion provided for mounting a cam in the form of a disc 88 best seen in Figs. 6 and 6A serving for actuating a spring member SP (see Fig. 6A) for controlling the opening and closing of contacts 95 and 96 connected in the energizing circuit of electromagnets 62 and 63 to cause the rotation of lead screw 40 in different directions and thereby moving the carriage 18 and wire guiding element 66 for winding the wire layers of the coil shown, for example, in Fig. 6B in which the layers are wound in position concentric to each other the whole length of the coil as determined by the spoolheads $d$ and $d1$.

Figure 5:
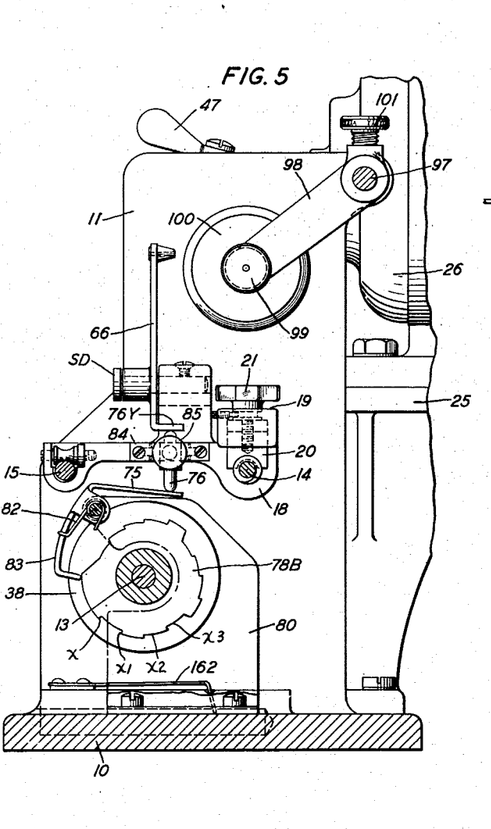
Fig. 5 is a vertical cross-sectional view taken on line 5—5 of Fig. 1.

On shaft 13 is keyed a wheel 73 best seen in Figs. 1, 2 and 8 cooperating with a step cam 78b shown in Fig. 5 for the winding of so-called bank wound type coil shown in Fig. 8B. The wheel 73 is formed at its periphery with a series of cam portions on each 180° of its circumference serving for controlling the operation of a contact 74 in the energizing circuit of electromagnet 62 for operating the lead screw 14 and thereby moving the carriage 18 and the wire guiding member 66 longitudinally of the core as 77 secured into the chuck 100 of spindle 24 for the winding of the above-mentioned coil the operation of the carriage being effected in timed relation with the angular movement of the wire guiding member 66 by the cam 78b in a sequence of operation which will be hereinafter described in detail.

A rod 97 is supported at both ends by upright supports 11 and 12 and on it is mounted for sliding and rotary movement a supporting arm 98 which may be adjusted for positioning the spindle 99 carried thereby in coaxial alignment relative to the longitudinal axis of spindle 24 for supporting the free end of the core as X shown in Fig. 1 during the winding of a coil, the opposite end of the core being secured as above mentioned to the chuck 100 at the end of spindle 24, while a thumbscrew 101 is provided for securing the arm 98 in any adjusted position along its supporting rod.

Figure 9:
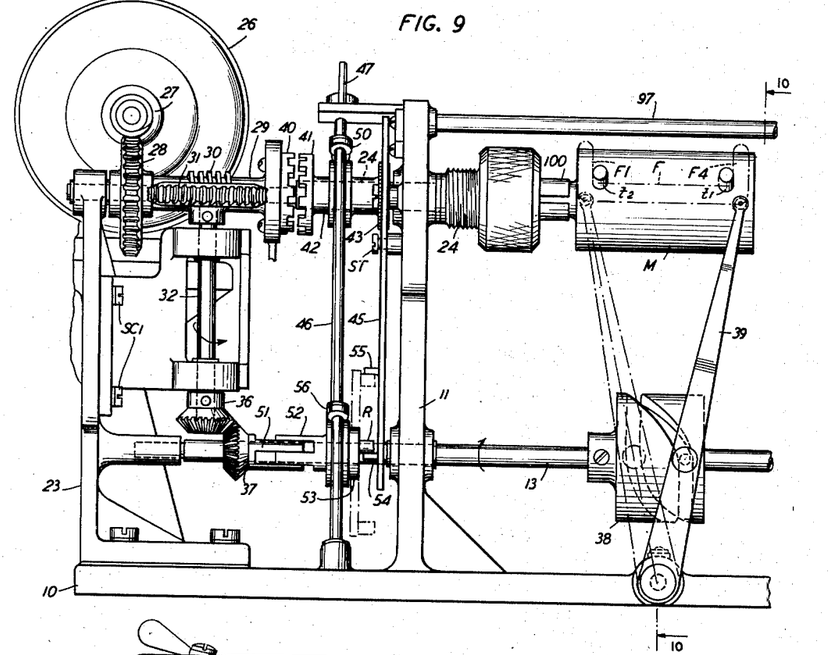
Fig. 9 is a view of the coil winding machine as set for the winding of a cathode ray tube.
Figure 11:
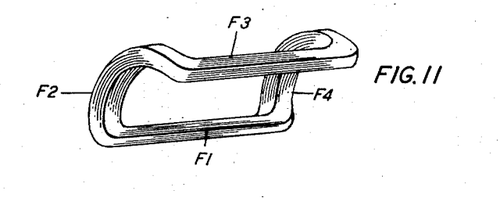
Fig. 11 is a perspective view of a cathode ray tube coil wound according to the setting of the coil winding machine of this invention as shown in Fig. 9.

In the operation of the coil winding machine of this invention supposing that it is desired to wind a coil of the type shown in Fig. 11 for use in connection with a cathode ray tube, the coil having two parallel straight sides F1 and F3 and two arcuate sides F2 and F4, the latter sides having a curvature corresponding to the diameter of the cathode ray tube on which the coil is to be used. The mandrel M as shown in Fig. 9 is provided with four radially disposed studs $t1$, $t2$, $t3$ and $t4$ serving for limiting the rectangular opening of the coil and is secured at one end to the chuck 100 on spindle 24.

The combination of operating parts used for the winding of a cathode ray tube coil includes the motor 26, the sleeve 29, the shaft 32 and the arm 53 on the shaft 13 now in position wherein the pin R carried by this arm is disposed in engageable relation with the lug-shaped portions 54 and 55 of the reciprocating bar 45. The sliding movement of arm 53 for engaging the roller R with lug portions 54 and 55 is effected by the turning movement of the rod 46 by handle 47. The turning movement of this rod is also effective to move the gear 43 from the position shown in Fig. 1 to the position indicated in Fig. 9, that is in engagement with pinion 44 which as above described engages the gear toothed rack portion of bar 45. With the wire guiding arm 39 in position adjacent the pin T1 the cam 38 is set on shaft 13 so that a rotary movement of this cam in the direction indicated by the arrow an angular distance corresponding to the angular distance between pins T1 and T3, the cam 38 will be ineffective to change the position of the wire guiding arm 39. The rotation of shaft 13 and the arm 53 carried thereby from the position shown in Fig. 4 is effective to move the bar 45 downwardly through the engagement of roller R with lug 55 of this bar to cause the rotation of spindle 24 and that of mandrel M for winding the arcuate side F4 of the coil, the downward movement of bar 45 occurring during a 90-degree angular movement of arm 53. The pin T3 of mandrel M is now in position indicated by the dotted line in Fig. 9. The continued rotation of shaft 13 and cam 38 carried thereby from 90 degrees to 180 degrees, the cam 38 causes the pivotal movement of the wire guiding member 39 to the position shown in dotted line for winding the parallel side F3 of the coil at the completion of which the roller R of arm 53 engages the lug 54 which has been moved downwardly upon the winding of the side F4 of the coil as above mentioned whereby the continued rotation of shaft 13 and the cam 38 from 180 degrees to 270 degrees is effective to wind the arcuate side F1 of the coil. Further the rotation of cam 38 from 180 degrees to 270 degrees being ineffective to change the position of guiding arm 39 which is now in the position shown in dotted line in Fig. 9, and the arm 53 270 degrees from starting position. The continued rotation of shaft 13 and that of cam 38 from 270 degrees to 360 degrees is effective to move the wire guiding member 39 from the position shown in dotted line to its starting position for winding the straight sides F of the coil and the arm 53 is now at its starting position as shown in Fig. 4, the operation above described being repeated for each turn of wire desired for the coil.

Supposing now that it is desired to wind a resistance coil of the type shown in Fig. 6B on the core $x$ shown in Fig. 1. The clutch element 41 is moved in engaged relation with clutch element 40 by the manual operation of rod 46 thus moving the gear 43 out of operative relation from pinion 44 and the arm 53 in position ineffective to actuate the rack bar 45 upon the rotation of shaft 13 by pinions 36 and 37.

Figure 12:
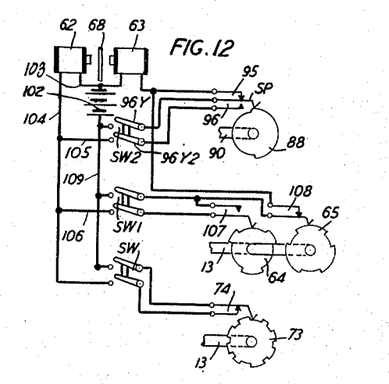
Fig. 12 is a diagrammatical view of a circuit and cam wheels serving for actuating contact springs in such circuit for controlling the energization of the electromagnets used for determining the operation of a duplex ratchet mechanism and thereby the operation of a wire guiding member for the winding of the different type of coils.

One of the spoolheads as $d$ of the coil is secured in the chuck 100 on spindle 24 and the other spoolhead inserted in the cup-shaped portion of a bushing B mounted for free rotation on the end of spindle 99 for supporting this end of the core. The switch SW2 shown in Fig. 12 forming part of the energizing circuit for the electromagnets 62 and 63 is closed while the switches SW and SW1 remain in the open position. Magnet 63 energizes in a circuit comprising the negative side of battery 102, the winding of this magnet, the contact 95 now closed by the cam 88, the prong 96Y of the switch SW2 to the positive side of battery 102. The energization of magnet 63 attracts the armature 68 causing the arm $a$ of the duplex pawl to engage the ratchet wheel W for rotating the latter an angular distance of one tooth for each turn of sleeve 29 and therefore that of the eccentric 58 upon the operation of motor 26.

Rotation of lead screw 14 is effective to move the carriage 18 and the wire guiding arm 66 in line parallel to the longitudinal axis of core $x$ for winding the first layer of the coil between the spools $d$ and $d1$ of the coil when the contact 95 is opened by the portion P of cam 88, and the contact 96 simultaneously closed thus causing the deenergization of electromagnet 63 and the energization of magnet 62 in a circuit comprising the negative side of battery 102, the wire 103, the winding of this magnet, the wire 104, the wire 105, the prong 96Y2 of the switch SW2 closed and contacts 96 now closed. The energization of magnet 62 is effective to attract the armature 68 and thereby causing the arm $a1$ of the duplex pawl to engage the ratchet wheel $w1$ for reversing the direction of rotation of lead screw 14 and that of carriage 18 for winding the second wire layer in concentric relation to the first layer on the core and this operation is repeated for the winding of any desired number of layers on the core. It is to be noted that the movement of carriage 18 as effected by the ratchet wheel $w$ and $w1$, and the lead screw 14, is equal to the size of wire used for the coil while the gear reduction between the pinions 86 and 87 determines the length of each layer or the distance between the spoolheads $d$ and $d1$ of the coil.

Supposing now that it is desired to wind a resistance coil of the type shown in Fig. 7A on the core $x$. The switch SW2 above mentioned is moved to the open position and the switch SW1 to the closed position for the control of contacts 107 and 108 Figs. 1, 7 and 12 by the operation of the cams 64 and 65 keyed on shaft 13. With the cam 78 set relative to arm 83 of plate 75 and cams 64 and 65 set relative to their respectively associated contacts 107 and 108 as best seen in Fig. 7 and considering the rotation of shaft 13 in the direction indicated by the arrow in that figure, the operation of motor 26 is effective to rotate the worm gear 28 and the spindle 24 through the engagement of clutch elements 40 and 41. The rotation of worm 30 is effective to rotate the worm wheel 31, the shaft 32 and thereby shaft 13 through pinions 36 and 37 and therefore the cam wheels 64 and 65 and the cam 78, the latter serving for operating the wire guiding arm 66 following each reverse operation of the lead screw 15 which as above mentioned is controlled by the operation of electromagnets 62 and 63.

The periphery of cam 78 as best seen in Fig. 13 is divided into thirty equal angular distances of 12 degrees, each 12 degrees corresponding to one turn of spindle 24. Similarly, the periphery of each cam 64 and 65 is divided into thirty angular distances of 12 degrees each 12 degrees corresponding to one turn of spindle 24 and therefore equal to one complete turn of eccentric 58 or one tooth of either ratchet wheel $w$ or $w1$. The closure of switch SW1 causes the energization of magnet 62 through a circuit including the negative side of battery 102, the wire 103, the winding of magnet 62, the wire 104, the wire 106, the switch SW1 closed, the contact 107 and wire 109 to the positive side of battery 102. The rotation of spindle 24 causes the winding of the wires 1, 2, 3 and 4 on the mandrel $x$ when the arm 83 of plate 75 engages the portion $a1$ of cam 78 under the normal tension of its retractile spring 82, for operating the guiding arm 66 preparatory to the winding of the turns 5, 6 and 7 in superposed relation to and at the intersection of the wire turns 1, 2, 3 and 4 above mentioned which is effected by the opening of contact 107 at point Z of cam 64 and by closing the contact 108 at point C of the cam 65 thus causing the energization of electromagnet 63 through an obvious circuit which attracts the armature 68 thereby causing the pawl $a$ of the duplex pawl to engage the ratchet wheel W for reversing the movement of lead screw 14 and of carriage 18 for winding the three turns 5, 6 and 7 above mentioned when the arm 83 of plate 75 engages the portion $a2$ of cam 78 to operate the wire guiding arm 66 preparatory to the winding of the turns 8 and 9 which is effected upon the opening of contact 108 and the closing of contact 107 to cause the magnet 62 to attract the armature 68 so as to change the direction of rotation of the lead screw while the cam 78 operates the wire guiding arm 83 of plate 75 upon the engagement of this arm by the portion $a3$ of the cam during which, turn No. 10 is wound directly on the coil in addition to the four turns 11, 12, 13 and 14 reaching the point C2 of cam 65 and point Z2 of cam 64 and this operation is repeated for each piled up section included in the coil. The cam 78 is mounted for free rotation on shaft 13 and is rotated by a gearing mechanism which comprises a gear 150 keyed on the shaft 13 meshing with the pinion 151 which is mounted for rotation as a unit with the gear 152 on a space 153 and the gear 152 meshing with the pinion 154 formed with the cam 78, the speed ratio being two turns of cam 78 for each turn of cams 64 and 65 keyed on shaft 13. For a practical purpose the cam 78 through its gear drive repeats the operation of the contact 74 following each turn of the cams 64 and 65.

Supposing now that it is desired to wind a coil of the type shown in Fig. 8A generally known as bank wound type. The switches SW1 and SW2 are moved in the open position and the switch SW is moved to the closed position to cause the energization of magnet 62 through the negative side of battery 102, the winding of magnet 62, the wire 104, the switch SW, the contact 74 and the positive side of battery 102. The magnet 62 attracts the armature 68 causing the arm $a1$ of the duplex pawl to engage its respective ratchet wheel $w1$ preparatory to the operation of motor 26.

The cam 73, as best seen in Fig. 8, is as above described keyed on shaft 13 and has its periphery divided into thirty angular spaces of twelve degrees each so combined as to form two series of unequally spaced cam portions in each series for the control of contact 74 in timed relation with the operation of plate 75 now moved on its pivot in position wherein its arm 83 engages the cam 78B keyed on shaft 13 as best seen in Fig. 5.

The operation of motor 26 is effective to rotate the worm 28 and thereby the spindle 24 through the engagement of clutch elements 40 and 41. The movement of worm 30 on sleeve 29 is imparted to the worm gear 31 and to the shaft 13 through angle gears 36 and 37. The operation of cam 73 on shaft 13 is effective to control the operation of contact 74 (see Figs. 1 and 8) and thereby the energization of magnet 62 while the rotation of cam 78B is effective to control the operation of plate 75 and therefore that of the wire guiding arm 66 in timed relation with the energization of magnet 62 by contact 74 and consequently the operation of carriage 18. With the cams 78B and 73 set relative to each other in the position shown in Figs. 5 and 8, the rotation of spindle 24 and that of the pawl a1 is effective to actuate the ratchet wheel w1 and thereby the lead screw 14 for the winding of the turns 1 and 2 of the coil (see Fig. 8B). At this point the cam 73 is moved from the position shown in Fig. 8 to a point wherein the portion Y of this cam opens the contact 74 to cause the deenergization of magnet 62 preliminarily to the winding of the wire, one turn, at the intersection of wire turn Nos. 1 and 2. The cam 78B is now in position wherein the arm 83 of plate 75 has just dropped by the tension of spring 82 into the recess X for operating the plunger 76 and thereby imparting a small angular movement to the wire guiding arm 66 for winding the wire turn No. 3 after which the cam 78B has moved in position wherein the point X1 of this cam engages the arm 83 of plate 75 so as to lower the plungers 76 for returning the wire guiding 66 to normal for winding the turn of wire No. 4 on the core.

The cam 73 at the completion of the winding of the wire turn No. 3 is now at the point wherein the point Y1 of this cam permits the closure of contact 74 to cause the rotation of the lead screw one step by the energization of the magnet 62 as above described for winding the turn No. 4 of the coil and the cam 73 is in position wherein the portion Y2 of this cam will open the contact 74 for winding the wire turns 5 and 6 in superposed relation to each other guided by the wire guiding arm 66 as effected by the cam portions x2 and x3 of cam 78B and this operation is repeated for the winding of the turns 7, 8, 9 and 10 followed by the winding of the turns 11, 12, 13, 14 and 15 to the completion of the coil.

What is claimed is:

1. In a machine for winding a coil having a plurality of parallel superposed layers wound on a core, said machine comprising a rotatable spindle having means for securely receiving the core, a lead screw, a pair of ratchet wheels keyed on said screw and effective in opposite direction to each other, a carriage actuated by the movement of said lead screw, an eccentric mounted on said spindle having an arm, ratchet pawls carried by said arm for rotating said ratchet wheels upon the rotation of said spindle but normally ineffective thereto, electromagnetic means for controlling the engagement of said pawls relative to said ratchet wheels to cause a reciprocating movement of said carriage for winding layers of wire in superposed relation on the core.

2. A machine for winding an electromagnet having a core and a plurality of concentrically disposed wire layers wound on the core, said machine comprising a pair of upright supports, a spindle mounted for free rotation on said supports, a sleeve mounted for free rotation on said spindle, a sleeve mounted for turning movement with said spindle but movable longitudinally thereon, a motor, a gear mechanism operatively connecting the first-mentioned sleeve to said motor, a clutch element carried by each of said sleeves engageable for rotating said spindle, a chuck carried by said spindle for securing one end of the core for rotating it, a lead screw, a ratchet mechanism operated by the movement of the first-mentioned sleeve for actuating said lead screw in either of two directions, a carriage actuated by the movement of said lead screw in said directions, a wire guiding element pivotally mounted on said carriage, a gearing mechanism actuated by said lead screw, a pair of contacts, a pair of electromagnets, an energizing circuit for said electromagnets connecting with said contacts, a cam actuated by the second-mentioned gearing mechanism for controlling the operation of said contacts to cause the alternate energization of said electromagnets, said magnets having a common armature operable for controlling the direction of rotation of said lead screw by said ratchet mechanism for winding the wire in parallel superposed relation on said core.

3. In a machine for winding a coil having a plurality of parallel superposed turns wound on a cylindrically-shaped core, said machine comprising a base, a pair of supports carried by said base, a rotatable spindle journaled in bearings in said support, means carried by said spindle for securing said core in position for winding the wire, a lead screw, a carriage actuated by said lead screw, means pivoted on said carriage for guiding the wire on said core, a pair of ratchet wheels keyed on one end of said lead screw for rotating the latter in either of two directions, an eccentric actuated by the operation of said spindle having an arm element, a duplex pawl pivotally mounted at the free end of said arm, a pair of electromagnets carried by said arm having a common armature carried by said duplex pawl, a pair of contacts, an energizing circuit for said magnets connecting with said contacts, a cam actuated by the movement of said lead screw for actuating said contacts for controlling the energization of said magnets for alternately causing said duplex pawl to engage with said ratchet wheels for winding the wires on said core upon the rotation of said spindle.

4. In a machine for winding coils having a plurality of concentric wire layers wound on a cylindrically-shaped core, said machine comprising a base having a pair of upright supports, a spindle mounted for free rotation on said support, a sleeve mounted for rotation on said spindle having a worm gear keyed thereon, a motor, a worm carried by the armature shaft of said motor engaging said worm gear for actuating said sleeve, another sleeve mounted for rotation with said spindle, interengaged clutch elements carried by each of said sleeves for rotating said spindle upon the rotation of the first-mentioned sleeve by said motor, a lead screw, a pair of ratchet wheels keyed on said lead screw having teeth formed for operation in opposite directions to each other, an eccentric actuated by the first-mentioned sleeve having an arm element, a duplex pawl pivotally mounted at the free end of said arm element and movable in position for alternately engaging said ratchet wheels for rotating said lead screw in either of said directions, a carriage actuated by the operation of said lead screw, means mounted on said carriage for guiding the wire on said core, a pair of contacts, a cam actuated by said lead screw for closing one of said contacts, an electromagnet controlled by the operation of said closed contact to cause the engagement of said duplex pawl with one of said ratchet wheels for operating said lead screw in one of said directions for winding the wires on said core to form the first layer thereover, said cam opening the first-mentioned contact and closing another contact, another magnet controlled by the closure of the last-mentioned contact to cause the movement of said duplex pawl for engaging the other of said ratchet wheels for operating said lead screw in another direction for winding another layer of wire on the first-mentioned layer.

5. In a machine for winding a bank wound coil, said machine comprising a base, a pair of upright supports carried by said base, a spindle mounted for rotary movement on said supports and serving for securely receiving the core for winding the coil, a sleeve mounted for free rotation on said spindle, a motor, a gear mechanism operatively connecting said sleeve to said motor, another sleeve mounted on said spindle for rotation therewith, interengaged clutch elements formed with said sleeves for rotating said spindle, a worm carried by the first-mentioned sleeve, a shaft disposed at right angles to said sleeve having a worm gear meshing with said worm, a shaft disposed in lines parallel to said spindle, means for operatively connecting said shafts, a cam mounted for free rotation on said parallel shaft, a gearing mechanism for rotating said cam upon the rotation of said parallel shaft, a lead screw, a ratchet wheel keyed on said lead screw, a carriage actuated by the operation of said lead screw having a wire guiding arm pivoted thereon operated under control of said cam, an eccentric mounted on one of said clutch elements having an arm member formed therewith, an electromagnet mounted on said arm member, an energizing circuit for said magnet, a pawl pivoted on said arm member having an armature disposed in attractable relation with said magnet to cause the engagement of said pawl with said ratchet wheel for rotating said lead screw for moving said carriage, a contact in the energizing circuit of said magnet, a cam keyed on said parallel shaft for controlling the operation of said contact to cause the movement of said carriage in timed relation with the operation of said wire guiding arm by the operation of the first-mentioned cam.

6. A machine for winding a coil, said machine comprising a rotatable spindle having means for securely receiving the core of the coil, a carriage, a wire-guiding member pivotally mounted on said carriage, an eccentric mounted on said spindle having an arm element, an electromagnet and a pawl carried by said arm, said pawl having an armature disposed in attractable relation with said magnet, a lead screw, a ratchet wheel keyed to said lead screw disposed in engageable relation with said pawl for rotating said lead screw upon the operation of said magnet to cause the movement of said carriage, a shaft geared to said spindle having a step-shaped cam, a pivoted plate having an arm engaging said cam, a plunger member mounted on said carriage operatively connecting said wire guiding arm to said plate, an energizing circuit for said magnet having a contact and a cam carried by said shaft for operating said contact for controlling the energization of said magnet for moving said wire-guiding member transverse of said core in timed relation to the pivotal movement of said guiding member on said carriage by said stepped cam.

7. A machine for winding a coil having a plurality of superposed reverting wire layers of different numbers of turns, said machine comprising a rotatable spindle having means for securely receiving one end of the core for the coils, a carriage, a wire guiding member mounted for angular movement on said carriage, a lead screw, a pair of ratchet wheels securely mounted on said lead screw, a pair of pawls movable as a unit operatively associated with said ratchet wheels, an eccentric, means for actuating said eccentric to cause the reciprocating movement of said pawls for operating said ratchet wheels but normally ineffective thereto, a pair of electromagnets, energizing circuits for said magnets having operable contacts, a shaft actuated by the operation of said means, a pair of wheels keyed on said shaft having a plurality of camming portions for actuating said contacts to cause alternatively the energization of said magnets, an armature common to said pawls disposed in attractable relation with either one of said magnets to cause one of said pawls to engage with one of said ratchet wheels for rotating said lead screw in a direction corresponding to the engaged ratchet wheel for moving said wire-guiding member transverse of the core, and a stepped shaped cam keyed on said shaft for pivoting said wire-guiding member for guiding the wire in superposed relation to each other in timed relation to the operation of said carriage of said lead screw.

CHARLES D. RICHARD.

REFERENCES CITED

The following references are of record in the file of this patent:

UNITED STATES PATENTS

| Number | Name | Date |
| --- | --- | --- |
| 404,213 | Millett | May 28, 1889 |
| 745,194 | Kennedy | Nov. 24, 1903 |
| 882,385 | Harter | Mar. 17, 1908 |
| 937,328 | Pomery | Oct. 19, 1909 |
| 1,067,235 | Barrett | July 15, 1913 |
| 1,446,267 | Newcomb | Feb. 20, 1923 |
| 1,589,456 | Begheth | June 22, 1926 |
| 1,704,904 | Schaub | Mar. 12, 1929 |
| 1,884,409 | Vienneau | Oct. 25, 1932 |
| 1,995,105 | Poole | Mar. 19, 1935 |
| 2,028,571 | Smulski | Jan. 21, 1936 |
| 2,053,764 | Chapman | Sept. 8, 1936 |
| 2,064,287 | Bieling | Dec. 15, 1936 |
| 2,095,214 | Furtado | Oct. 5, 1937 |
| 2,180,208 | Jacob | Nov. 14, 1939 |
| 2,335,975 | Stahl | Dec. 7, 1943 |
| 2,373,427 | Stickney | Apr. 10, 1945 |